US011781284B2

(12) United States Patent
Hagiwara et al.

(10) Patent No.: US 11,781,284 B2
(45) Date of Patent: Oct. 10, 2023

(54) WORK VEHICLE AND CONTROL METHOD

(71) Applicant: KOMATSU LTD., Tokyo (JP)

(72) Inventors: Hirohito Hagiwara, Tokyo (JP); Toshihiro Yone, Tokyo (JP); Naoto Ikeda, Tokyo (JP)

(73) Assignee: KOMATSU LTD., Tokyo (JP)

( * ) Notice: Subject to any disclaimer, the term of this patent is extended or adjusted under 35 U.S.C. 154(b) by 593 days.

(21) Appl. No.: 16/474,135

(22) PCT Filed: Feb. 2, 2018

(86) PCT No.: PCT/JP2018/003584
§ 371 (c)(1),
(2) Date: Jun. 27, 2019

(87) PCT Pub. No.: WO2018/159211
PCT Pub. Date: Sep. 7, 2018

(65) Prior Publication Data
US 2019/0382984 A1 Dec. 19, 2019

(30) Foreign Application Priority Data
Mar. 3, 2017 (JP) ................................. 2017-040512

(51) Int. Cl.
E02F 9/20 (2006.01)
B60K 20/02 (2006.01)
(Continued)

(52) U.S. Cl.
CPC ............ *E02F 9/2079* (2013.01); *B60K 20/02* (2013.01); *E02F 3/7636* (2013.01); *E02F 3/841* (2013.01);
(Continued)

(58) Field of Classification Search
CPC ....... E02F 9/2079; E02F 3/7636; E02F 3/841; E02F 9/2004; E02F 9/202; E02F 9/2087;
(Continued)

(56) References Cited

U.S. PATENT DOCUMENTS 1,981,821 A * 11/1934 Beatty .................. E02F 3/7604
172/292
2,017,101 A * 10/1935 Lapsley .............. F16H 63/3013
74/343

(Continued)

FOREIGN PATENT DOCUMENTS

JP S62-230596 A 10/1987
JP H05-172221 A 7/1993
(Continued)

*Primary Examiner* — Edwin J Toledo-Duran
(74) *Attorney, Agent, or Firm* — Faegre Drinker Biddle & Reath LLP

(57) ABSTRACT

A work vehicle includes an operation apparatus, a transmission having a plurality of gear positions, and a controller configured to control shift of a gear position of the transmission to a gear position equal to or lower than a shift upper limit position based on a vehicle speed of the work vehicle. The controller makes setting to raise the shift upper limit position by one position based on a first operation having been performed onto the operation apparatus. The controller changes the shift upper limit position from a first shift upper limit position immediately before a second operation different from the first operation to a second shift upper limit position based on the second operation having been performed onto the operation apparatus. The second shift upper limit position is higher than the first shift upper limit position by at least two positions.

13 Claims, 10 Drawing Sheets

(51) Int. Cl.
  *E02F 3/76* (2006.01)
  *E02F 3/84* (2006.01)
  *F16H 3/00* (2006.01)
(52) U.S. Cl.
  CPC ............ *E02F 9/202* (2013.01); *E02F 9/2004* (2013.01); *E02F 9/2087* (2013.01); *F16H 3/00* (2013.01); *F16H 2200/006* (2013.01)
(58) Field of Classification Search
  CPC ... E02F 9/20; B60K 20/02; F16H 3/00; F16H 2200/006; F16H 61/0204; B60Y 2200/417; B60Y 2200/411; G05G 9/047; B66C 13/00–15/06
  See application file for complete search history.

(56) References Cited

U.S. PATENT DOCUMENTS

| | | | | |
|---|---|---|---|---|
| 2,300,036 | A * | 10/1942 | Peterson | F16H 3/10 192/17 R |
| 2,358,846 | A * | 9/1944 | Andres | F16D 67/00 477/56 |
| 2,581,552 | A * | 1/1952 | O'Hagan | B61L 25/04 246/29 R |
| 5,012,698 | A * | 5/1991 | Hayasaki | F16H 59/10 477/139 |
| 8,068,963 | B2 * | 11/2011 | Sugiura | F16H 61/0213 477/140 |
| 8,370,032 | B2 * | 2/2013 | Choby | F16H 59/66 303/162 |
| 8,775,034 | B2 * | 7/2014 | Hyodo | E02F 9/2079 701/50 |
| 8,777,808 | B2 * | 7/2014 | Hyodo | E02F 9/2079 477/181 |
| 8,855,870 | B2 * | 10/2014 | Hyodo | F16D 48/06 701/67 |
| 9,091,221 | B2 * | 7/2015 | Hyodo | F02D 41/021 |
| 9,383,002 | B2 * | 7/2016 | Tanaka | B60K 20/02 |
| 9,523,315 | B2 * | 12/2016 | Hyodo | F02D 31/001 |
| 10,018,267 | B2 * | 7/2018 | Hathaway | F16H 61/0213 |
| 10,549,970 | B2 * | 2/2020 | Puszkiewicz | B66F 17/00 |
| 11,015,706 | B2 * | 5/2021 | Bieber | B60W 10/101 |
| 11,167,765 | B2 * | 11/2021 | Naitou | B60W 30/19 |
| 2006/0185457 | A1 * | 8/2006 | Yoshikawa | F16H 59/08 74/335 |
| 2010/0069199 | A1 * | 3/2010 | Hyodo | E02F 9/2004 477/115 |
| 2010/0236229 | A1 * | 9/2010 | Kuma | F16H 61/48 60/330 |
| 2012/0004797 | A1 * | 1/2012 | Baino | B60W 10/06 180/65.265 |
| 2013/0136624 | A1 * | 5/2013 | Kitao | F16H 61/4035 417/212 |
| 2014/0129192 | A1 * | 5/2014 | Blank | G07C 5/085 703/2 |
| 2015/0226316 | A1 * | 8/2015 | Tanaka | B60K 20/02 701/51 |
| 2019/0390435 | A1 * | 12/2019 | Harada | E02F 9/205 |
| 2020/0247418 | A1 * | 8/2020 | Naitou | F16H 61/0213 |

FOREIGN PATENT DOCUMENTS

| | | |
|---|---|---|
| JP | H10-121522 A | 5/1998 |
| JP | H11-28945 A | 2/1999 |
| JP | H11-294579 A | 10/1999 |
| JP | 2002-127779 A | 5/2002 |
| JP | 2005-247293 A | 9/2005 |
| JP | 2015-89691 A | 5/2015 |
| JP | 2015-90163 A | 5/2015 |

* cited by examiner

| | | SHIFT UPPER LIMIT POSITION | | | | | | | |
|---|---|---|---|---|---|---|---|---|---|
| | | F-1 | F-2 | F-3 | F-4 | F-5 | F-6 | F-7 | F-8 |
| GEAR POSITION | F-1 | ○ | | | | | | | |
| | F-2 | | ○ | | | | | | |
| | F-3 | | | ○ | | | | | |
| | F-4 | | | | ○ | ○↕ | ○↕ | ○↕ | ○↕ |
| | F-5 | | | | | ◎ | ◎↕ | ◎↕ | ◎↕ |
| | F-6 | | | | | | ◎ | ◎↕ | ◎↕ |
| | F-7 | | | | | | | ◎ | ◎↕ |
| | F-8 | | | | | | | | ◎ |

WORK VEHICLE AND CONTROL METHOD

TECHNICAL FIELD

The present disclosure relates to a work vehicle and a control method in a work vehicle.

BACKGROUND ART

Conventionally in a work vehicle, a gear position of a multiple-speed transmission is set based on a vehicle speed or the like.

Japanese Patent Laying-Open No. 10-121522 (PTL 1) discloses an earthmoving machine vehicle including a first switch and a second switch in a boom control lever as such a work vehicle. When the first switch is pressed while manual gear shift has been set in the earthmoving machine vehicle, a gear position is downshifted, and when the second switch is pressed, the gear position is upshifted. A shift upper limit position of the multiple-speed transmission is set by such upshifting and downshifting. An actual gear position is set based on a vehicle speed, within a range not exceeding the shift upper limit position.

CITATION LIST

Patent Literature

PTL 1: Japanese Patent Laying-Open No. 10-121522

SUMMARY OF INVENTION

Technical Problem

In the earthmoving machine vehicle in PTL 1, each time the second switch is pressed once, the shift upper limit position is raised by one position. Therefore, when an operator attempts to raise the shift upper limit position by a plurality of positions, the operator should press the second switch a plurality of times.

The present disclosure was made in view of the problem above, and provides a work vehicle and a control method capable of promptly raising a shift upper limit position of a transmission to a prescribed gear position higher by a plurality of positions.

Solution to Problem

According to one aspect of the present disclosure, a work vehicle includes a first operation apparatus, a transmission having a plurality of gear positions, and a controller configured to control shift of a gear position of the transmission to a position equal to or lower than a shift upper limit position based on a vehicle speed of the work vehicle. The controller is configured to make setting to raise the shift upper limit position by one position based on a first operation having been performed onto the first operation apparatus. The controller is configured to change the shift upper limit position from a first shift upper limit position immediately before a second operation different from the first operation to a second shift upper limit position based on the second operation having been performed onto the first operation apparatus. The second shift upper limit position is higher than the first shift upper limit position by at least two positions.

Advantageous Effects of Invention

According to the present disclosure, the shift upper limit position can promptly be raised to a prescribed gear position higher by a plurality of positions.

BRIEF DESCRIPTION OF DRAWINGS

FIG. 4 is a diagram representing relation between a shift upper limit position and a gear position during forward travel.

DESCRIPTION OF EMBODIMENTS

Figure 1:
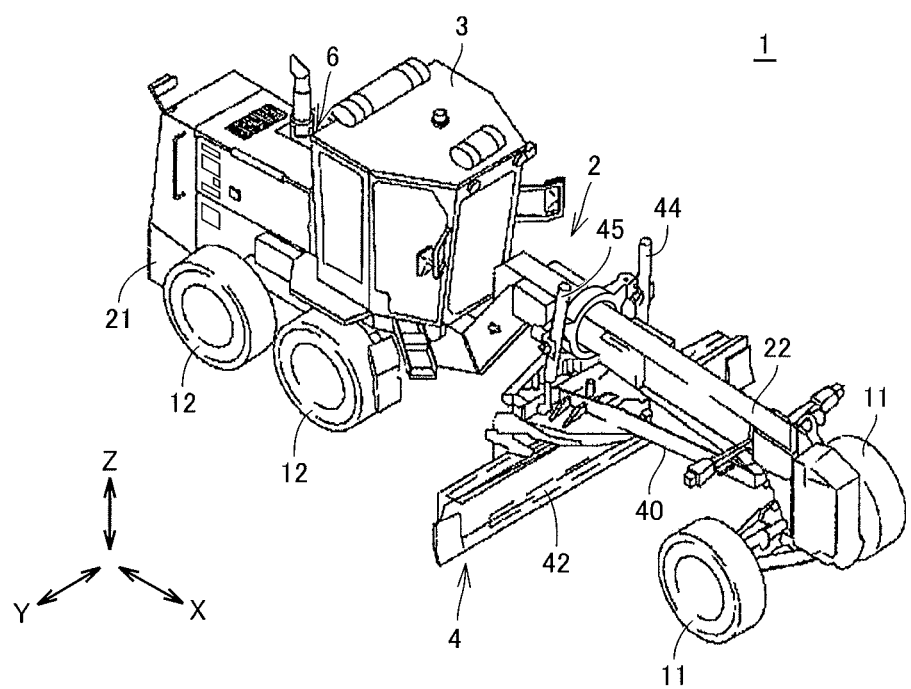
FIG. 1 is a perspective view schematically showing a construction of a motor grader.

A work vehicle according to an embodiment will be described below. Identical components in the description below have the same reference characters allotted and their labels and functions are also identical. Therefore, detailed description thereof will not be repeated.

Use of features in the embodiment as being combined as appropriate is originally intended. Some of components may not be used.

Though a motor grader is described below by way of example of a work vehicle, the work vehicle is not limited to the motor grader but it may be a hydraulic excavator, a wheel loader, a crawler dozer, a dump truck, or a crawler dump truck.

A motor grader will be described below with reference to the drawings. In the description of the drawings below, a direction in which the motor grader travels in straight lines is referred to as a fore/aft direction of the motor grader. In the fore/aft direction of the motor grader, a side where a front wheel is arranged with respect to a work implement is defined as the fore direction. In the fore/aft direction of the motor grader, a side where a rear wheel is arranged with respect to the work implement is defined as the aft direction. A lateral direction of the motor grader is a direction orthogonal to the fore/aft direction in a plan view. A right side and a left side in the lateral direction in facing front are defined as a right direction and a left direction, respectively. An upward/downward direction of the motor grader is a direction orthogonal to the plane defined by the fore/aft direction and the lateral direction. A side in the upward/downward direction where the ground is located is defined as a lower side and a side where the sky is located is defined as an upper side.

<A. Appearance>

FIG. 1 is a perspective view schematically showing a construction of a motor grader 1 in one embodiment of the present disclosure.

As shown in FIG. 1, motor grader 1 in the present embodiment mainly includes running wheels 11 and 12, a vehicular body frame 2, an operator's cab 3, and a work implement 4. Motor grader 1 includes components such as an engine arranged in an engine compartment 6. Work implement 4 includes a blade 42. Motor grader 1 can do such works as land-grading works, snow removal works, light cutting, and mixing of materials with blade 42.

Running wheels 11 and 12 include a front wheel 11 and a rear wheel 12. Though FIG. 1 shows running wheels which consist of two front wheels 11 one on each side and four rear wheels 12 two on each side, the number of front wheels and rear wheels and arrangement thereof are not limited as such.

Vehicular body frame 2 includes a rear frame 21 and a front frame 22. Rear frame 21 supports such components as an engine arranged in engine compartment 6.

For example, each of four rear wheels 12 is attached to rear frame 21 to rotationally be driven by driving force from the engine. Front frame 22 is attached in front of rear frame 21. For example, two front wheels 11 are rotatably attached to a front end portion of front frame 22.

Operator's cab 3 is carried on front frame 22. In operator's cab 3, an operation portion (not shown) such as a steering wheel, a gear shift lever, a work implement lever for controlling work implement 4, a brake, an accelerator pedal, and an inching pedal is provided. Operator's cab 3 may be carried on rear frame 21.

Work implement 4 mainly includes a draw bar 40 and blade 42.

Draw bar 40 has a front end portion swingably attached to the front end portion of front frame 22. Draw bar 40 has a rear end portion supported on front frame 22 by a pair of lift cylinders 44 and 45.

Motor grader 1 includes a transmission having a plurality of gear positions.

<B. Operator's Cab>

Figure 2:
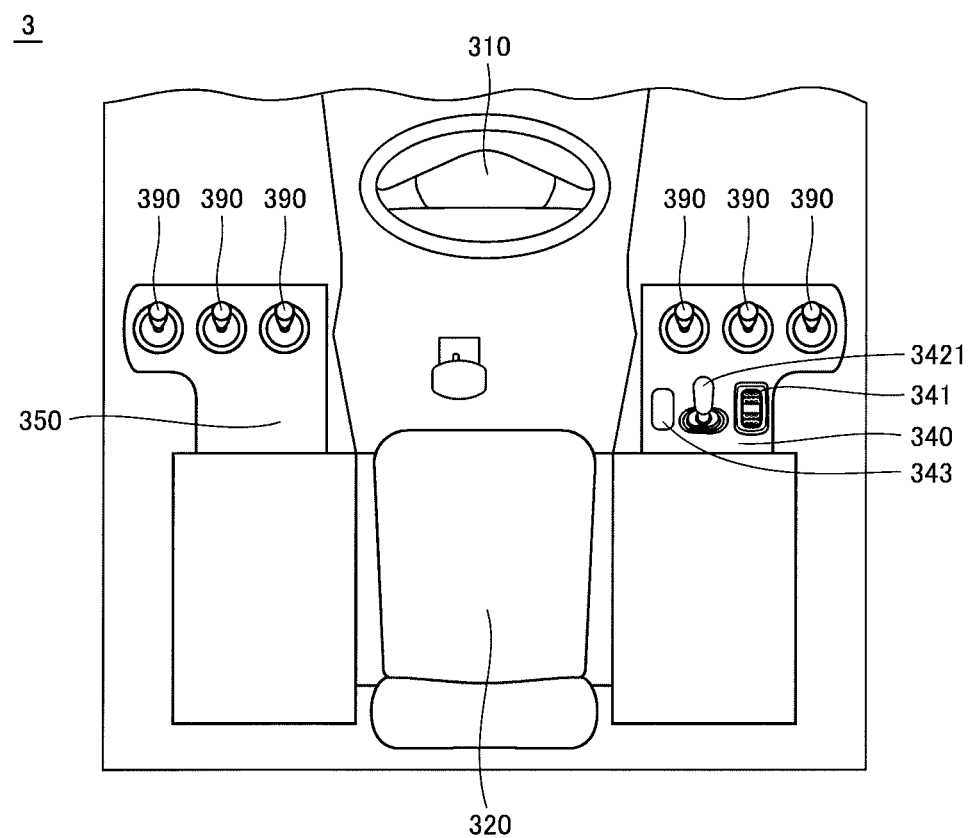
FIG. 2 is a diagram for illustrating details of an operator's cab.

FIG. 2 is a diagram for illustrating details of operator's cab 3.

As shown in FIG. 2, operator's cab 3 includes a steering wheel 310, an operator seat 320, and consoles 340 and 350. Console 340 is arranged on the right of operator seat 320. Console 350 is arranged on the left of operator seat 320.

In console 340, a forward and rearward travel switch 341, a shift lever 3421, a work implement locking switch 343, and a plurality of work implement levers 390 are arranged.

In console 350, a plurality of work implement levers 390 are arranged.

Forward and rearward travel switch 341 is a switch which can be operated in the fore/aft direction. When an operator moves forward and rearward travel switch 341 in the fore direction and forward and rearward travel switch 341 is set to a forward travel position, a forward clutch (not shown) is engaged. When the operator moves forward and rearward travel switch 341 in the aft direction and forward and rearward travel switch 341 is set to a rearward travel position, a rearward clutch (not shown) is engaged.

Figure 3:
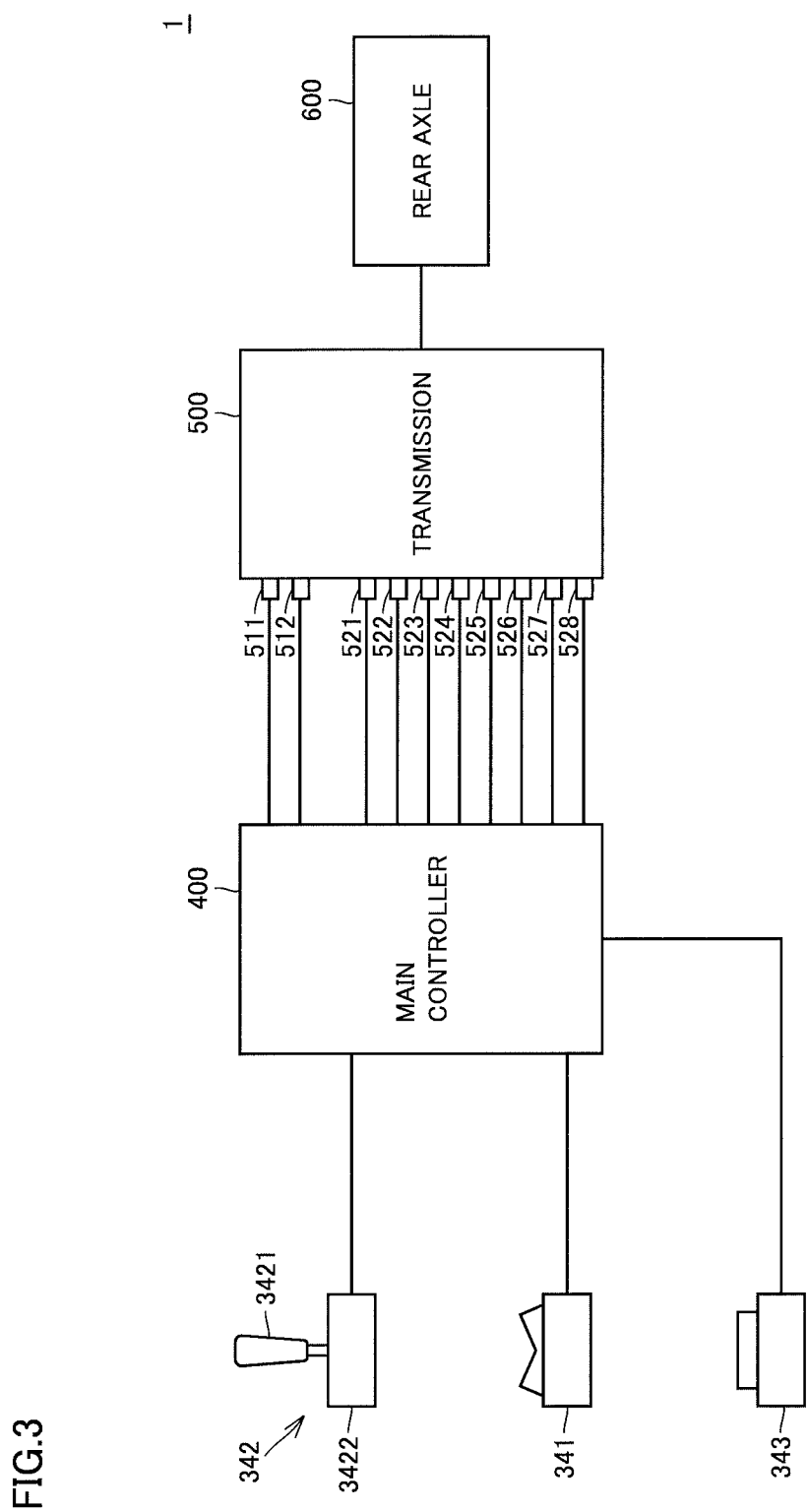
FIG. 3 is a diagram representing a part of a hardware configuration of the motor grader.

Shift lever 3421 is a control lever implemented by a joystick 342 (FIG. 3). Shift lever 3421 is set to a neutral position, a position (which is also referred to as an "up position" below) for raising a shift upper limit position by one position in response to an operation by an operator to the right from the neutral position, and a position (which is also referred to as a "down position" below) for lowering the shift upper limit position by one position in response to an operation by the operator to the left from the neutral position. When the operator tilts shift lever 3421 to the right from the neutral position, the up position is set. When the operator tilts shift lever 3421 to the left from the neutral position, the down position is set.

The "shift upper limit position" represents a highest allowable gear position among a plurality of shift positions of a transmission. For example, when the transmission has eight gear positions for forward travel and when the shift upper limit position is set to a seventh position, motor grader 1 does not upshift the gear position to an eighth position. Relation between the shift upper limit position and an actual gear position will be described later (FIG. 4).

<C. Hardware Configuration>

FIG. 3 is a diagram representing a part of a hardware configuration of motor grader 1.

As shown in FIG. 3, motor grader 1 includes forward and rearward travel switch 341, joystick 342, work implement locking switch 343, a main controller 400, a transmission 500, proportional solenoid control valves 511 and 512, proportional solenoid control valves 521 to 528, and a rear axle 600.

(c1. Joystick)

Joystick 342 includes shift lever 3421 and an operation detector 3422.

Joystick 342 has an automatic return function to automatically return shift lever 3421 to the neutral position. When an operator releases his/her hand from shift lever 3421, joystick 342 returns shift lever 3421 to the neutral position owing to a built-in spring.

Operation detector 3422 transmits to main controller 400, a command signal having a voltage value different among examples in which shift lever 3421 is located at the neutral position, the up position, and the down position. Operation detector 3422 outputs to main controller 400, a command signal having a voltage value higher by a prescribed value than a voltage at the time when shift lever 3421 is located at the neutral position, each time shift lever 3421 accepts an operation to move from the neutral position to the up position. While shift lever 3421 is located at the up position, operation detector 3422 continues to output the command signal throughout this period. Operation detector 3422 applies during this period, a voltage higher by a prescribed value than a voltage at the time when shift lever 3421 is located at the neutral position to a wire which connects operation detector 3422 and main controller 400 to each other.

Operation detector 3422 may be configured to transmit to main controller 400, a command signal having a current value different among examples in which shift lever 3421 is located at the neutral position, the up position, and the down position. A configuration may be such that operation detector 3422 and main controller 400 are connected to each other by three wires and a different wire is applied among examples in which the shift lever is located at an intermediate position, the up position, and the down position.

A continuous operation not shorter than a predetermined time period Th onto joystick 342 is referred to as a "long-pressing operation" below for the sake of convenience of description. An operation by an operator to move shift lever 3421 from the neutral position to the up position and to maintain shift lever 3421 at the up position for predetermined time period Th or longer of the "long-pressing operation" is also referred to as a "long-pressing operation in the up direction."

A continuous operation shorter than predetermined time period Th onto joystick 342 is referred to as a "short-pressing operation." An operation by an operator to move shift lever 3421 from the neutral position to the up position of the "short-pressing operation" is also referred to as a "short-pressing operation in the up direction."

(c2. Forward and Rearward Travel Switch)

Forward and rearward travel switch 341 transmits to main controller 400, a command signal having a voltage value different among examples in which a movable portion of forward and rearward travel switch 341 is located at the neutral position, the forward travel position, and the rearward travel position. While the movable portion is located at the up position, forward and rearward travel switch 341 outputs to main controller 400 throughout this period, a command signal having a voltage value higher by a prescribed value than when the movable portion is located at the neutral position.

Forward and rearward travel switch 341 may be configured to transmit to main controller 400, a command signal having a current value different among examples in which the movable portion is located at the neutral position, the up position, and the down position. The configuration may be such that forward and rearward travel switch 341 and main controller 400 are connected to each other through three wires and a different wire is applied among examples in which the movable portion is located at an intermediate position, the up position, and the down position.

(c3. Work Implement Locking Switch)

Work implement locking switch 343 locks an operation by work implement 4. Work implement locking switch 343 transmits to main controller 400, a command signal having a voltage value different between a pressed state and a non-pressed state. Work implement locking switch 343 may be configured not to output a command signal when any one of the pressed state and the non-pressed state is set (a voltage value being set to 0 V).

(c4. Transmission and Proportional Solenoid Control Valve)

Transmission 500 includes a forward clutch, a rearward clutch, and gear position clutches from a first gear to an eighth gear. The gear position clutch sets a gear position.

Proportional solenoid control valve 511 generates a pilot pressure in accordance with a command current from main controller 400, and with the pilot pressure, has the forward clutch engaged. Proportional solenoid control valve 512 generates a pilot pressure in accordance with a command current from main controller 400, and with the pilot pressure, has the rearward clutch engaged.

Proportional solenoid control valve 521 generates a pilot pressure in accordance with a command current from main controller 400, and with the pilot pressure, has the gear position clutch of the first gear engaged. Proportional solenoid control valve 522 generates a pilot pressure in accordance with a command current from main controller 400, and with the pilot pressure, has the gear position clutch of a second gear engaged. Similarly hereafter, proportional solenoid control valves 523 to 528 have respective gear position clutches from a third gear to the eighth gear engaged.

(c5. Main Controller)

Main controller 400 controls operations by motor grader 1 as a whole. Main controller 400 receives a command signal from each of forward and rearward travel switch 341, joystick 342, and work implement locking switch 343.

Main controller 400 has the forward clutch or the rearward clutch of transmission 500 engaged in response to an operation by an operator onto forward and rearward travel switch 341. Main controller 400 controls a state of engagement of the forward clutch by controlling a command current to be fed to proportional solenoid control valve 511 connected to transmission 500. Main controller 400 controls a state of engagement of the rearward clutch by controlling a command current to be fed to proportional solenoid control valve 512 connected to transmission 500.

Main controller 400 controls shift of a gear position of transmission 500 based on information on a shift upper limit position set by an operation by the operator onto joystick 342 and information on a vehicle speed of motor grader 1. Main controller 400 shifts a gear position of the transmission by controlling a command current to be fed to proportional solenoid control valves 521 to 528 connected to transmission 500.

Figure 6:
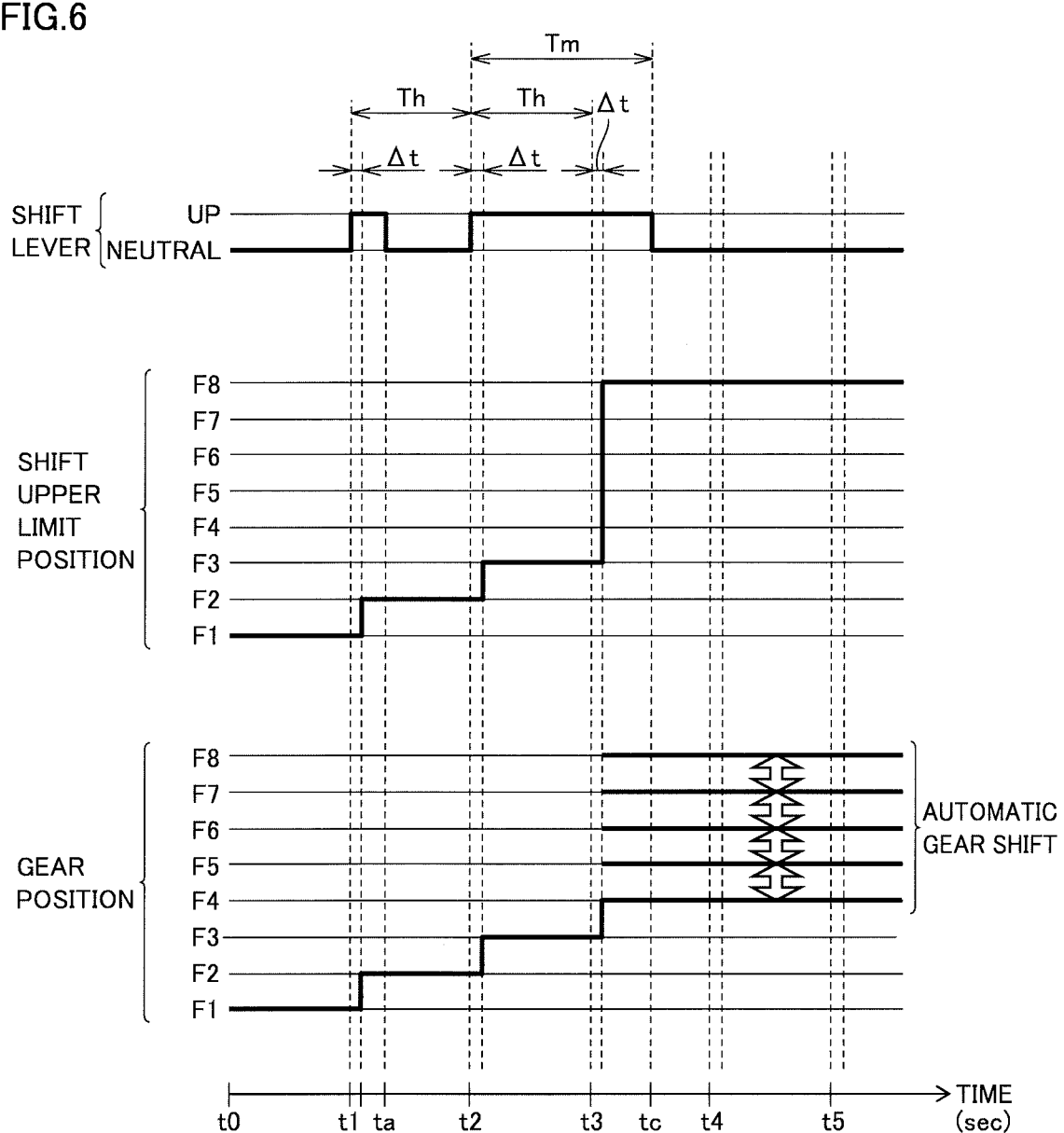
FIG. 6 is a timing chart when a long-pressing operation in the up direction is performed.

When main controller 400 receives a command signal based on the short-pressing operation in the up direction from joystick 342, it makes setting to raise the shift upper limit position of the gear position of transmission 500 by one position. In addition, main controller 400 controls transmission 500 to maintain the gear position equal to or lower than the shift upper limit position. Setting of the shift upper limit position at the time when main controller 400 receives a command signal based on the long-pressing operation in the up direction from joystick 342 will be described later (FIG. 6).

Joystick 342, shift lever 3421, the up position, and the down position represent examples of the "first operation apparatus," the "control lever," the "first position," and the "second position" in the present disclosure, respectively. Forward and rearward travel switch 341, transmission 500, and main controller 400 represent examples of the "third operation apparatus," the "transmission," and the "controller" in the present disclosure, respectively. The short-pressing operation in the up direction and the long-pressing operation in the up direction represent examples of the "first operation" and the "second operation" in the present disclosure, respectively.

<D. Shift Change>

FIG. 4 is a diagram representing relation between a shift upper limit position and a gear position during forward travel.

As shown in FIG. 4, when the shift upper limit position is set to the first gear (which is denoted as "F-1" in FIG. 4) in main controller 400, main controller 400 sets the gear position of the transmission to the first gear (which is denoted as "F-1" in FIG. 4). Similarly, when the shift upper limit position is set to the second gear, the third gear, and a fourth gear, main controller 400 sets the gear position of the transmission to the second gear, the third gear, and the fourth gear, respectively.

When the shift upper limit position is set to a fifth gear, main controller 400 controls the gear position between the fourth gear and the fifth gear based on a vehicle speed. A double circle in FIG. 4 indicates lockup when a speed is high.

When the shift upper limit position is set to a sixth gear, main controller 400 controls the gear position between the fourth gear and the sixth gear based on a vehicle speed. When the shift upper limit position is set to a seventh gear, main controller 400 controls the gear position between the fourth gear and the seventh gear based on a vehicle speed. When the shift upper limit position is set to the eighth gear, main controller 400 controls the gear position between the fourth gear and the eighth gear based on a vehicle speed.

Main controller 400 thus automatically shifts the gear based on a vehicle speed when the shift upper limit position is between the fifth gear and the eighth gear. When the shift upper limit position is set between the fifth gear and the eighth gear, main controller 400 does not set the gear position to the third gear or lower.

Relation among an operation of shift lever 3421, the shift upper limit position, and the gear position during forward travel will be described below with reference to two examples.

Figure 5:
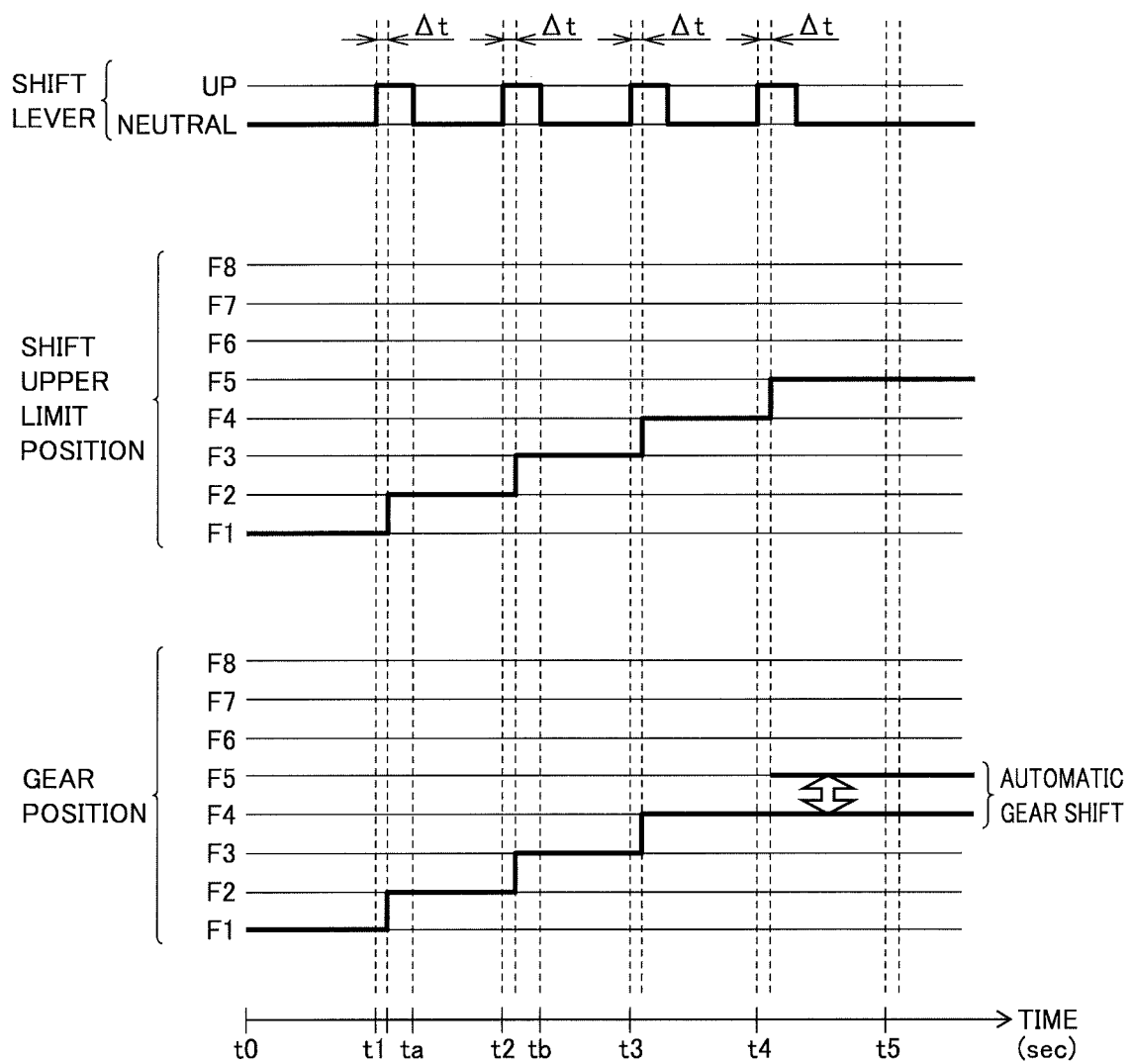
FIG. 5 is a timing chart when a short-pressing operation in an up direction is repeatedly performed.

FIG. 5 is a timing chart when the short-pressing operation in the up direction is repeatedly performed.

As shown in FIG. 5, when an operator starts the short-pressing operation in the up direction at time t1 while the shift upper limit position and the gear position are set to the first gear, a command signal is output from joystick 342 to main controller 400. In the example in this figure, the command signal is output until time ta. Main controller 400 raises the shift upper limit position from the first gear to the second gear Δt second after time t1, and raises the gear position from the first gear to the second gear based on relation between the shift upper limit position and the gear position shown in FIG. 4.

When the operator starts the short-pressing operation in the up direction at time t2, a command signal is output to main controller 400. In the example in this figure, the command signal is output until time tb. Main controller 400 raises the shift upper limit position from the second gear to the third gear Δt second after time t2 and raises the gear position from the second gear to the third gear based on relation between the shift upper limit position and the gear position shown in FIG. 4.

When the operator starts the short-pressing operation in the up direction at time t3, a command signal is output to main controller 400. Main controller 400 raises the shift upper limit position from the third gear to the fourth gear Δt second after time t3 and raises the gear position from the third gear to the fourth gear based on relation between the shift upper limit position and the gear position shown in FIG. 4.

When the operator starts the short-pressing operation in the up direction at time t4, a command signal is output to main controller 400. Main controller 400 raises the shift upper limit position from the fourth gear to the fifth gear Δt second after time t4. In this case, main controller 400 performs automatic gear shift as shown in relation between the shift upper limit position and the gear position in FIG. 4. Main controller 400 sets the gear position to the fourth gear or the fifth gear based on a vehicle speed.

FIG. 6 is a timing chart when the long-pressing operation in the up direction is performed.

As shown in FIG. 6, when the operator performs the short-pressing operation in the up direction at time t1 while the shift upper limit position and the gear position are set to the first gear, a command signal is output from joystick 342 to main controller 400. Main controller 400 raises the shift upper limit position from the first gear to the second gear Δt second after time t1, and raises the gear position from the first gear to the second gear based on relation between the shift upper limit position and the gear position shown in FIG. 4.

When the operator starts the long-pressing operation in the up direction at time t2, a command signal is output to main controller 400. In the example in this figure, the command signal is output until time tc. A time period Tm from time t2 until time tc is longer than predetermined time period Th. Time period Th can be set, for example, to one second.

Main controller 400 raises the shift upper limit position from the second gear to the third gear Δt second after time t2 and raises the gear position from the second gear to the third gear based on relation between the shift upper limit position and the gear position shown in FIG. 4. After lapse of at least time period Th since time t2 (at time t3), main controller 400 determines that a command to set the shift upper limit position to the eighth gear representing the highest gear position has been accepted.

In this case, main controller 400 changes the shift upper limit position from the third gear to the eighth gear after lapse of a time period Th+Δt since time t2 (when time t3+Δt comes). Thus, in motor grader 1, the eighth gear is set following the third gear as the shift upper limit position. Specifically, main controller 400 performs processing for setting the shift upper limit position to a shift upper limit position higher by at least two positions (for example, the eighth gear) (which is also referred to as "jump processing" below) not via the fourth gear, the fifth gear, the sixth gear, and the seventh gear.

Thereafter, main controller 400 performs automatic gear shift as shown in relation between the shift upper limit position and the gear position in FIG. 4. Main controller 400 controls the gear position between the fourth gear and the eighth gear based on a vehicle speed.

As set forth above, main controller 400 controls the shift upper limit position to change from the shift upper limit position immediately before the long-pressing operation in the up direction to the eighth gear representing the highest gear position of transmission 500 based on the long-pressing operation having been performed.

When the shift upper limit position has been set to the seventh gear as a result of repeated short-pressing operations in the up direction, the shift upper limit position is raised only by one position in spite of the long-pressing operation in the up direction as above because the eighth gear is the upper limit gear position.

The eighth gear representing the highest gear position of transmission 500 represents one example of the "second shift upper limit position" in the present disclosure. The second shift upper limit position may be a gear position lower than the highest gear position (for example, the seventh gear). The second shift upper limit position can also be regarded as the shift upper limit position set subsequently to a first shift upper limit position. The fourth gear as the shift upper limit position represents one example of the "predetermined threshold position" in the present disclosure.

<E. Functional Configuration>

Figure 7:
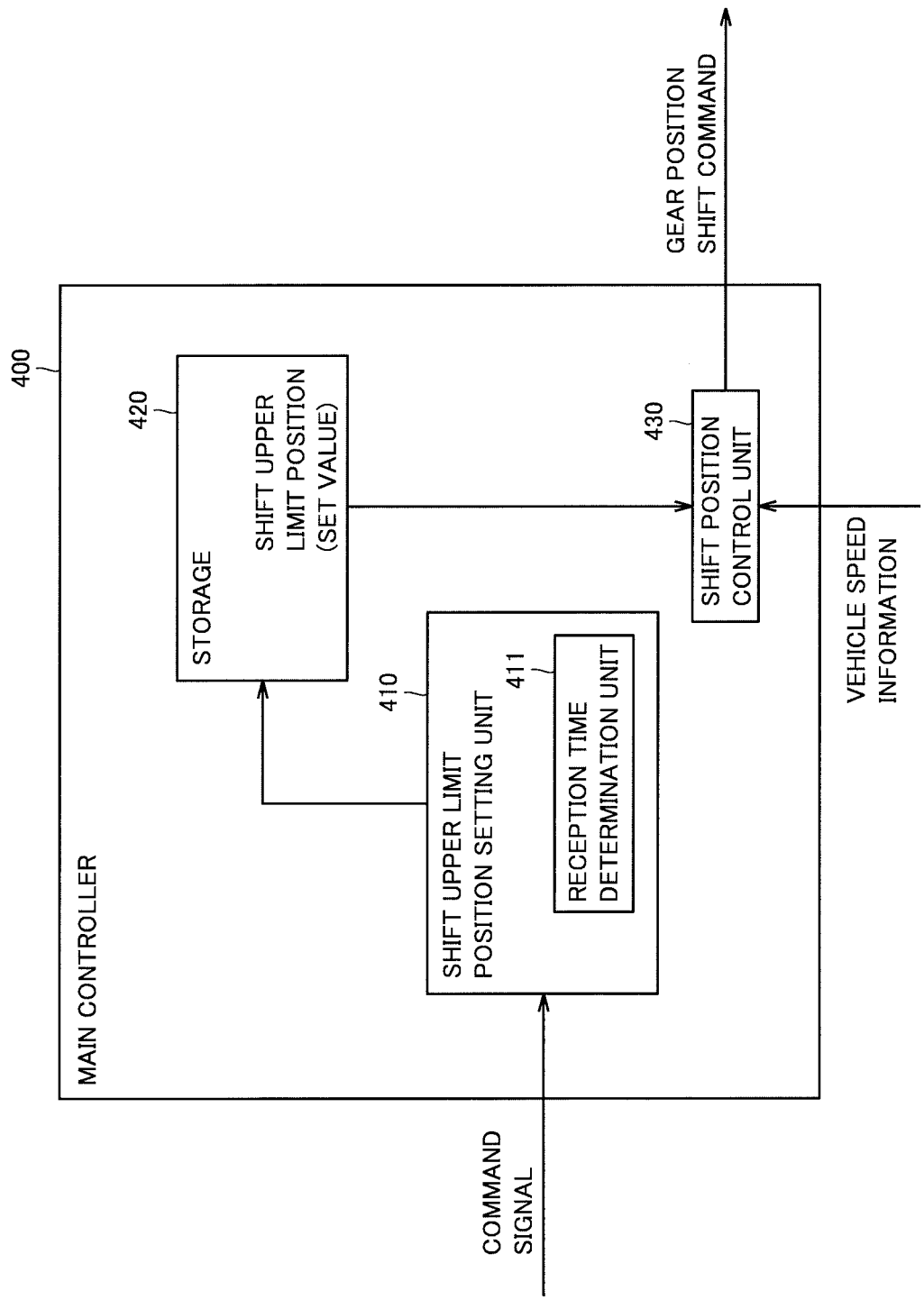
FIG. 7 is a functional block diagram representing a functional configuration of a main controller.

FIG. 7 is a functional block diagram representing a functional configuration of main controller 400.

As shown in FIG. 7, main controller 400 includes a shift upper limit position setting unit 410, a storage 420, and a shift position control unit 430. Shift upper limit position setting unit 410 includes a reception time determination unit 411.

Storage 420 stores a current shift upper limit position.

Shift upper limit position setting unit 410 sets the shift upper limit position based on a command signal received from joystick 342. Shift upper limit position setting unit 410 updates the shift upper limit position stored in storage 420 with a set value each time setting is made. Updating processing is as below.

When shift upper limit position setting unit 410 receives a command signal from joystick 342, it raises the shift upper limit position by one position. When shift upper limit position setting unit 410 determines that it has received the command signal continuously for predetermined time period Th or longer, it changes the shift upper limit position to the eighth gear representing the highest gear position. Whether or not a command signal has continuously been received for predetermined time period Th or longer is determined by reception time determination unit 411.

Shift position control unit 430 controls transmission 500 to maintain a gear position equal to or lower than the shift upper limit position stored in storage 420 based on information on a vehicle speed of motor grader 1. Shift position control unit 430 outputs to proportional solenoid control valves 521 to 528, a command current as a gear position shift command for shifting the gear position of transmission 500.

When the shift upper limit position is equal to or lower than the fourth gear, shift position control unit 430 controls transmission 500 to set the gear position thereof to a gear position as high as the set upper limit position as shown in FIG. 4. When the shift upper limit position is higher than the fourth gear, shift position control unit 430 controls transmission 500 to set the gear position thereof to a gear position within a range equal to or higher than the fourth gear and not higher than the shift upper limit position.

Though FIG. 7 shows a configuration in which storage 420 is provided separately from shift upper limit position setting unit 410, the configuration may be such that shift upper limit position setting unit 410 stores the shift upper limit position and each time the shift upper limit position is changed (updated), shift upper limit position setting unit 410 notifies the shift position control unit of the changed shift upper limit position.

Figure 8:
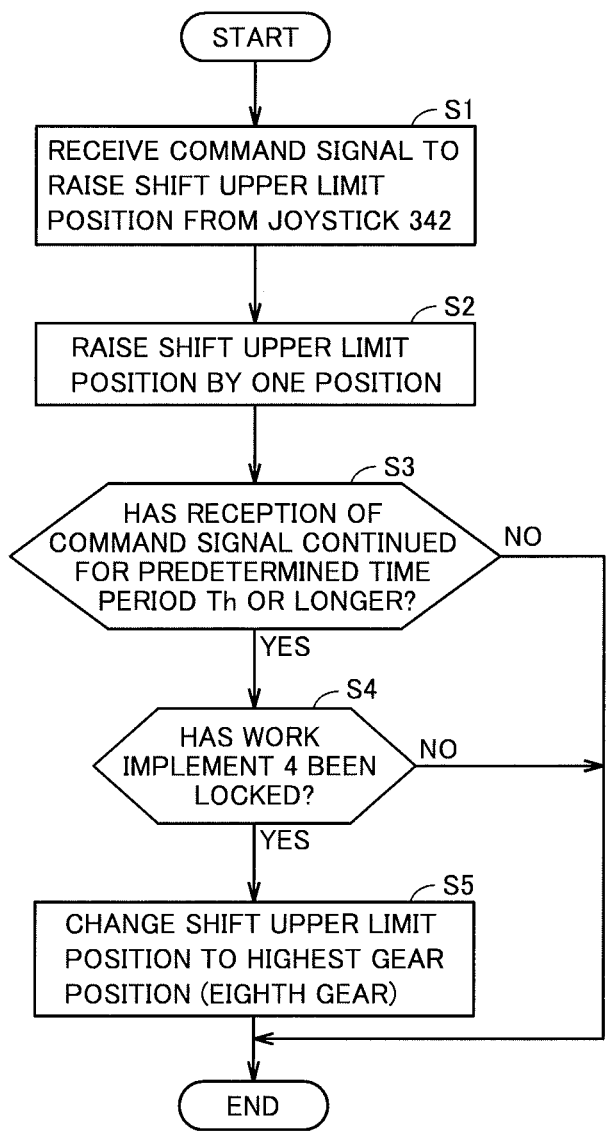
FIG. 8 is a flowchart for illustrating a flow of control processing during forward travel in the motor grader.

FIG. 8 is a flowchart for illustrating a flow of control processing during forward travel in motor grader 1.

As shown in FIG. 8, in step S1, main controller 400 receives a command to raise the shift upper limit position from joystick 342 based on an operation of joystick 342 to the right. In step S2, main controller 400 raises the shift upper limit position by one position.

In step S3, main controller 400 determines whether or not it has been receiving a command signal continuously for predetermined time period Th or longer. When main controller 400 determines that it has been receiving the command signal continuously for predetermined time period Th or longer (YES in step S3), it determines in step S4 whether or not work implement 4 has made transition to a locked state by work implement locking switch 343. When main controller 400 determines that it has not been receiving the command signal continuously for predetermined time period Th or longer (NO in step S3), a series of processing ends.

When main controller 400 determines that work implement 4 has been locked (YES in step S4), it changes the set upper limit position from the current set upper limit position to the highest gear position (eighth gear). When main controller 400 determines that work implement 4 has not been locked (NO in step S4), it quits the series of processing without changing the set upper limit position from the current set upper limit position to the highest gear position.

The reason why whether or not work implement 4 has been locked is determined in step S4 is because jump processing for setting the shift upper limit position to the eighth gear is to be performed only during traveling or the like in which land-grading works are not performed. Without being limited as such, main controller 400 may be configured to permit the jump processing while work implement 4 is locked. Though an example in which jump processing is performed during forward travel is shown above, jump processing is also applicable to a gear position in rearward travel.

<F. Advantages>

(1) Motor grader 1 includes joystick 342, transmission 500 having a plurality of gear positions, and main controller 400 which carries out control to shift a gear position of transmission 500 to a gear position equal to or lower than a shift upper limit position based on a vehicle speed of motor grader 1. Main controller 400 makes setting to raise the shift upper limit position by one position based on the short-pressing operation in the up direction having been performed onto joystick 342. Main controller 400 changes the shift upper limit position from the shift upper limit position immediately before the long-pressing operation in the up direction to a highest gear position (eighth gear) based on the long-pressing operation in the up direction having been performed.

According to such a configuration, an operator can raise the shift upper limit position to the highest gear position at once simply by performing the long-pressing operation in the up direction. In addition, processing for raising the shift upper limit position by one position and processing for raising the shift upper limit position to the highest gear position can be performed simply by performing an operation onto joystick 342.

(2) The first operation and the second operation are operations onto shift lever 3421 of joystick 342. Therefore, the shift upper limit position can be raised to the highest gear position at once by continuously operating shift lever 3421 for a predetermined time period or longer.

(3) Shift lever 3421 is set to the neutral position, the up position for raising the shift upper limit position by one position by performing the short-pressing operation in the up direction, and the down position for lowering the shift upper limit position by one position by an operation to move shift lever 3421 in a direction opposite to a direction in the short-pressing operation in the up direction. The long-pressing operation in the up direction is an operation to move shift lever 3421 from the neutral position to the up position and maintain shift lever 3421 at the up position for a predetermined time period or longer.

According to such a configuration, an operator can raise the shift upper limit position to the highest gear position at once by moving shift lever 3421 from the neutral position to the up position and maintaining shift lever 3421 at the up position for a predetermined time period or longer.

(4) Main controller 400 controls transmission 500 such that a gear position thereof is as high as the shift upper limit position when the shift upper limit position is equal to or lower than the fourth gear. When the shift upper limit position is higher than the fourth gear, main controller 400 controls transmission 500 such that a gear position thereof is within a range not lower than the fourth gear and not higher than the shift upper limit position.

According to such a configuration, when the shift upper limit position is higher than the fourth gear, the gear position is never set to a gear position equal to or lower than the fourth gear. Therefore, even though a speed is lowered, the gear position is never set to a gear position equal to or lower than the fourth gear. Therefore, the number of times of gear shift of the gear position can be smaller than a configuration in which a gear position equal to or lower than the fourth gear is set when a speed is lowered.

(5) Motor grader 1 further includes forward and rearward travel switch 341 configured to switch between forward travel and rearward travel. Main controller 400 carries out control to change the shift upper limit position to the highest gear position on condition that forward and rearward travel switch 341 is at the forward travel position.

According to such a configuration, the shift upper limit position can be raised to the highest gear position at once by the long-pressing operation in the up direction performed by an operator while motor grader 1 travels forward.

(6) Motor grader 1 includes work implement 4 and work implement locking switch 343 configured to lock operations by work implement 4. Main controller 400 carries out control to change the shift upper limit position to the highest gear position on condition that work implement locking switch 343 has locked operations by the work implement.

According to such a configuration, the shift upper limit position can be raised to the highest gear position at once by the long-pressing operation in the up direction performed by an operator while operations by work implement 4 are locked.

<G. Modification>

(1) First Modification

Though joystick 342 is described by way of example as an operation apparatus configured to change a gear position of transmission 500 in the embodiment above, limitation thereto is not intended.

Figure 9:
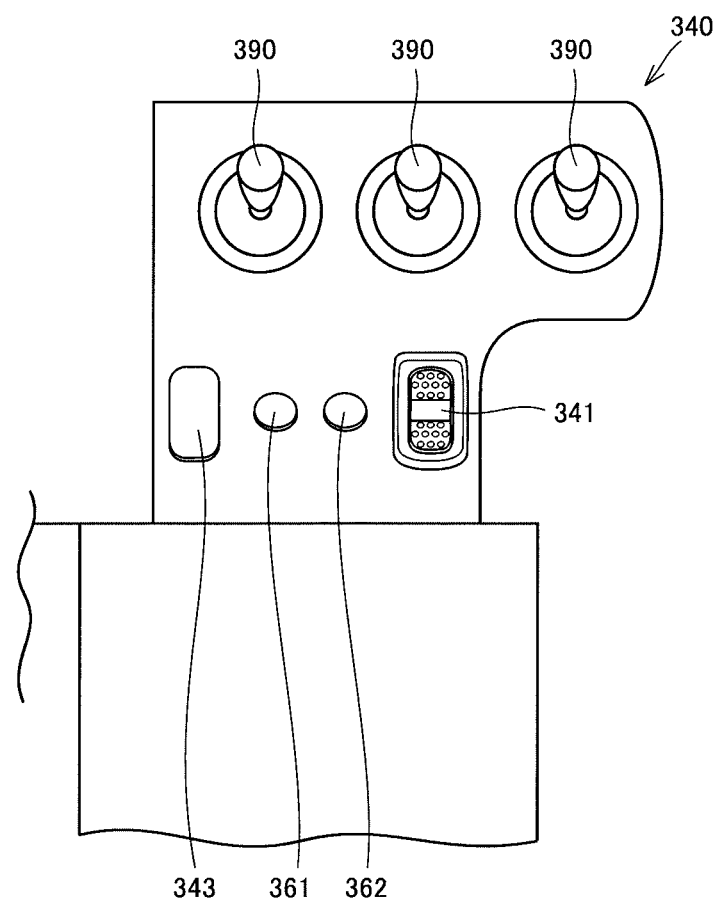
FIG. 9 is a diagram representing a configuration in which a push button switch is employed as an operation apparatus for changing a gear position.

FIG. 9 is a diagram representing a configuration in which a push button switch is employed as an operation apparatus for changing a gear position. As shown in FIG. 9, console 340 includes push button switches 361 and 362 as an operation apparatus instead of joystick 342.

Push button switch 361 functions as a switch for lowering the shift upper limit position. Push button switch 362 functions as a switch for raising the shift upper limit position.

When pressing of push button switch 362 continues for predetermined time period Th or longer, main controller 400 performs processing for jumping to the eighth gear described above. When an operation to press push button switch 362 continues for a period shorter than predetermined time period Th, main controller 400 raises the shift upper limit position by one position.

Therefore, an operator can raise the shift upper limit position to the highest gear position at once simply by pressing and holding push button switch 362.

Push button switches 361 and 362 also represent examples of the "first operation apparatus" in the present disclosure. Push button switch 361 and push button switch 362 represent examples of the "second push button switch" and the "first push button switch" in the present disclosure, respectively.

(2) Second Modification

Though a configuration in which joystick 342 is used to perform processing for jumping to the eighth gear is described by way of example in the embodiment above, limitation thereto is not intended. Main controller 400 may be configured to perform processing for jumping to the eighth gear by using an operation apparatus (for example, a push button switch) provided separately from joystick 342.

Figure 10:
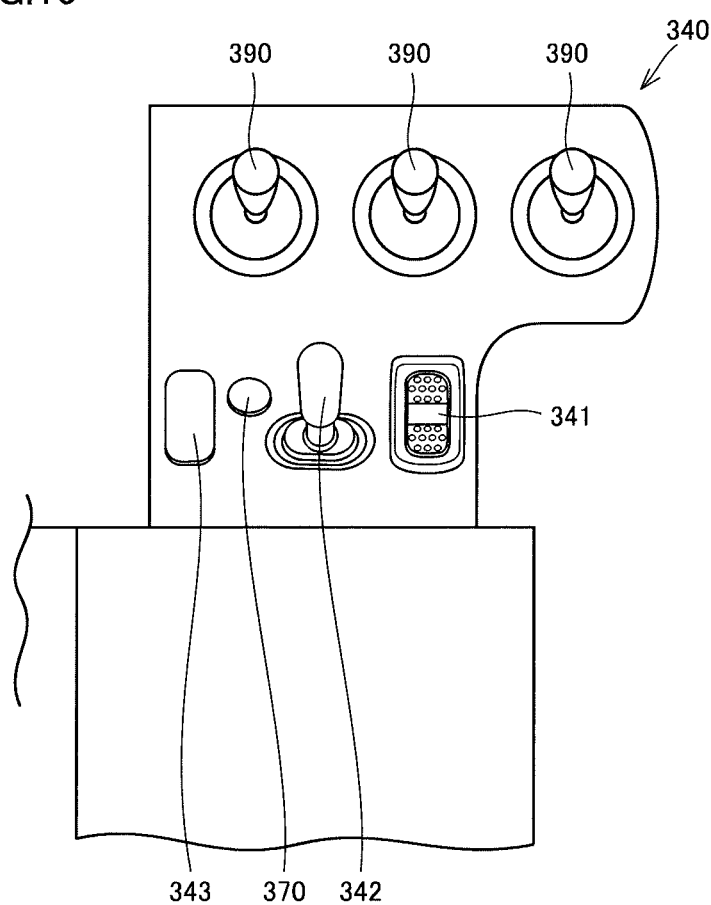
FIG. 10 is a diagram representing a configuration in which a push button switch is employed as an apparatus for performing jump processing.

FIG. 10 is a diagram representing a configuration in which a push button switch is employed as an apparatus for performing jump processing. As shown in FIG. 10, console 340 includes a push button switch 370. Push button switch 370 is arranged between joystick 342 and work implement locking switch 343 by way of example. Push button switch 370 may be provided in shift lever 3421 of joystick 342.

When push button switch 370 is pressed in such a configuration, main controller 400 performs processing for jumping to the eighth gear described above.

When push button switch 362 is a button of an automatic return type, main controller 400 may be configured to perform jump processing on condition that a duration of pressing of push button switch 370 is longer than a threshold value by way of example.

Push button switch 370 represents one example of the "second operation apparatus" and the "push button switch" in the present disclosure.

(3) Third Modification

Steering wheel 310 alone is described by way of example of an input apparatus for a steering apparatus (not shown) in the embodiment above. In the present modification, a configuration including steering wheel 310 and a steering lever for steering as an input apparatus for a steering apparatus will be described.

The steering lever is typically provided in console 340. A function of the steering lever can be switched on or off by an operation by an operator.

Main controller 400 changes the shift upper limit position to the highest gear position (jump processing) on condition that the steering apparatus is controllable from the steering lever (the function of the steering lever is switched on) based on an operation by an operator onto the steering lever.

In such a configuration, for example, instead of step S4 in FIG. 8, processing "for main controller 400 to determine whether or not the steering apparatus is controllable by an operation onto the steering lever" may be performed. In this case, main controller 400 allows the process to proceed to step S5 when the steering apparatus is controllable by an operation onto the steering lever.

The embodiment disclosed herein is illustrative and not restricted only to the disclosure above. The scope of the present disclosure is defined by the terms of the claims and is intended to include any modifications within the scope and meaning equivalent to the terms of the claims.

REFERENCE SIGNS LIST

1 motor grader; 2 vehicular body frame; 3 operator's cab; 4 work implement; 6 engine compartment; 11 front wheel; 12 rear wheel; 21 rear frame; 22 front frame; 40 draw bar; 42 blade; 44, 45 lift cylinder; 310 steering wheel; 320 operator seat; 340, 350 console; 341 forward and rearward travel switch; 342 joystick; 343 work implement locking switch; 361, 362, 370 button switch; 390 work implement lever; 400 main controller; 410 shift upper limit position setting unit; 411 reception time determination unit; 420 storage; 430 shift position control unit; 500 transmission; 511, 512, 521, 522, 523, 528 proportional solenoid control valve; 600 rear axle; 3421 shift lever; 3422 operation detector

The invention claimed is:

1. A work vehicle comprising:
a first operation apparatus having at least an up position and a neutral position, the first operation apparatus being one or more of a control lever, a switch, and a joystick;
a transmission having a plurality of gear positions; and
a controller that controls shifting of a gear position of the plurality of gear positions of the transmission to a position equal to or lower than a shift upper limit position based on a vehicle speed of the work vehicle, the shift upper limit position represents a gear position among the plurality of gear positions of the transmission,
the controller further:
raises the shift upper limit position by one position based on a first operation on the first operation apparatus, the first operation moving the first operation apparatus to the up position from the neutral position and the first operation holding the first operation apparatus at the up position for less than a predetermined time, and changes the shift upper limit position from a first shift upper limit position immediately before a second operation on the first operation apparatus, which is different from the first operation, to a second shift upper limit position based on the second operation on the first operation apparatus, the second shift upper limit position being higher than the first shift upper limit position by at least two positions, the second operation moving the first operation apparatus to the up position from the neutral position and the second operation holding the first operation apparatus at the up position for the predetermined time or longer.

2. The work vehicle according to claim 1, wherein the second shift upper limit position is a highest gear position of the transmission.

3. The work vehicle according to claim 1, wherein the first operation apparatus is implemented by a control lever that accepts the first operation and the second operation that move the control lever to the up position from the neutral position.

4. The work vehicle according to claim 3, wherein the control lever is set to the neutral position, the up position for raising the shift upper limit position by one position in response to the first operation, and a down position for lowering the shift upper limit position by one position in response to a third operation for moving the control lever in a direction opposite to a direction in the first operation, and the second operation is an operation for moving the control lever from the neutral position to the up position and maintaining the control lever at the up position for the predetermined time period or longer.

5. The work vehicle according to claim 1, wherein the first operation apparatus is implemented by a first push button switch.

6. The work vehicle according to claim 5, further comprising:

a second push button switch that lowers the shift upper limit position by one position.

7. The work vehicle according to claim 1, wherein the controller further:

controls the transmission to set the gear position to a gear position as high as the shift upper limit position when the shift upper limit position is equal to or lower than a predetermined threshold position, and controls the transmission to set the gear position to a gear position within a range equal to or higher than the predetermined threshold position and equal to or lower than the shift upper limit position when the shift upper limit position is higher than the predetermined threshold position.

8. The work vehicle according to claim 1, further comprising:

a steering apparatus; and
a plurality of steering input apparatuses, wherein
the controller changes the shift upper limit position to the second shift upper limit position on condition that the steering apparatus is in a controllable state based on an operation onto a predetermined steering input apparatus of the plurality of steering input apparatuses.

9. The work vehicle according to claim 1, further comprising:

a third operation apparatus that switches between forward travel and rearward travel, the third operation apparatus being one or more of a control lever, a switch, and a joystick, wherein the controller changes the shift upper limit position to the second shift upper limit position on condition that the third operation apparatus is set to a forward travel position.

10. The work vehicle according to claim 1, comprising:

a work implement; and
a locking apparatus that locks an operation by the work implement, wherein
the controller changes the shift upper limit position to the second shift upper limit position on condition that the locking apparatus has locked the operation by the work implement.

11. The work vehicle according to claim 1, the work vehicle being implemented by a grader.

12. The work vehicle according to claim 1, wherein the work vehicle is one of a motor grader, a hydraulic excavator, a wheel loader, a crawler dozer, a dump truck, and a crawler dump truck.

13. A control method in a work vehicle including an operation apparatus, the control method comprising:

raising a shift upper limit position of a gear position of a plurality of gear positions of a transmission by one position based on a first operation on the operation apparatus, the shift upper limit position represents a gear position among the plurality of gear positions of the transmission, the operation apparatus being one or more of a control lever, a switch, and a joystick, the first operation moving the operation apparatus to a an up position from a neutral position and the first operation holding the operation apparatus at the up position for less than a predetermined time;

shifting the gear position to a position equal to or lower than the shift upper limit position based on a vehicle speed of the work vehicle; and changing the shift upper limit position from a first shift upper limit position immediately before a second operation on the first operation apparatus, which is different from the first operation, to a second shift upper limit position based on the second operation on the operation apparatus, the second shift upper limit position being higher than the first shift upper limit position by at least two positions, the second operation moving the operation apparatus to the up position from the neutral position and the second operation holding the operation apparatus at the up position for the predetermined time or longer.

* * * * *